United States Patent
Lundahl et al.

(10) Patent No.: US 9,977,945 B2
(45) Date of Patent: May 22, 2018

(54) FINGERPRINT SENSING DEVICE AND METHOD FOR MANUFACTURING A FINGERPRINT SENSING DEVICE

(71) Applicant: Fingerprint Cards AB, Göteborg (SE)

(72) Inventors: Karl Lundahl, Göteborg (SE); Robert Hägglund, Linköping (SE); Emil Hjalmarson, Linköping (SE); Rolf Sundblad, Ljungsbro (SE); Christer Jansson, Linköping (SE)

(73) Assignee: Fingerprint Cards AB, Göteborg (SE)

( * ) Notice: Subject to any disclaimer, the term of this patent is extended or adjusted under 35 U.S.C. 154(b) by 0 days. days.

(21) Appl. No.: 15/464,680

(22) Filed: Mar. 21, 2017

(65) Prior Publication Data
US 2017/0351895 A1 Dec. 7, 2017

(30) Foreign Application Priority Data
Jun. 1, 2016 (SE) ........................ 1650769

(51) Int. Cl.
*G06K 9/00* (2006.01)
*G06F 3/041* (2006.01)

(52) U.S. Cl.
CPC ....... *G06K 9/0002* (2013.01); *G06K 9/00087* (2013.01); *G06F 3/0412* (2013.01);
(Continued)

(58) Field of Classification Search
CPC ............. G06K 9/00033; G06K 9/0004; G06K 9/0002; G06K 9/00087; G06F 3/044;
(Continued)

(56) References Cited

U.S. PATENT DOCUMENTS 6,284,561 B1 9/2001 Hung
2004/0252867 A1* 12/2004 Lan ..................... G06K 9/0004
382/124

(Continued)

FOREIGN PATENT DOCUMENTS

WO WO 2010/023323 3/2010
WO WO 2015/013530 1/2015

OTHER PUBLICATIONS

Swedish Search Report from Swedish Application No. 1650769-1, dated Jan. 30, 2017.

*Primary Examiner* — Kenny Cese
(74) *Attorney, Agent, or Firm* — RMCK Law Group PLC

(57) ABSTRACT

There is provided a capacitive fingerprint sensing device for sensing a fingerprint pattern of a finger, said capacitive fingerprint sensing device comprising: a protective top layer to be touched by said finger; a first metal layer comprising a two-dimensional array of sensing structures arranged underneath said top layer; a second metal layer, arranged underneath said first metal layer, comprising a plurality of conductive structures a dielectric layer arranged between the first and second metal layers to electrically insulate the first metal layer from the second metal layer, the dielectric layer comprising a low-k material; and readout circuitry arranged underneath said second metal layer and coupled to each of the electrically conductive sensing structures by means of via connections to receive a sensing signal indicative of a distance between said finger and said sensing structure. There is also provided a method for manufacturing such a device.

14 Claims, 4 Drawing Sheets

(52) U.S. Cl.
CPC ............... *G06F 2203/0338* (2013.01); *G06F 2203/04103* (2013.01)

(58) Field of Classification Search
CPC ......... G06F 3/0416; G06F 2203/04103; G06F 2203/04111; G06F 3/03547; G06F 3/041; G06F 3/0412; G06F 2203/0338; A61B 2562/0214; G01R 27/2605; G01R 27/26; G09G 2300/0426
See application file for complete search history.

(56) References Cited

U.S. PATENT DOCUMENTS

| | | | |
|---|---|---|---|
| 2008/0248605 A1 | 10/2008 | Taussig et al. | |
| 2010/0052424 A1* | 3/2010 | Taylor | H01L 23/5223 307/45 |
| 2013/0009653 A1* | 1/2013 | Fukushima | G06F 3/044 324/679 |
| 2013/0194071 A1* | 8/2013 | Slogedal | G06K 9/0002 340/5.82 |
| 2015/0015537 A1* | 1/2015 | Riedijk | G06F 3/044 345/174 |
| 2016/0034740 A1* | 2/2016 | Wickboldt | G06K 9/00026 382/124 |
| 2016/0123775 A1 | 5/2016 | Chen et al. | |
| 2016/0154989 A1 | 6/2016 | Lin | |
| 2016/0275332 A1 | 9/2016 | Lin et al. | |
| 2016/0300096 A1* | 10/2016 | Kim | G06K 9/0002 |
| 2017/0047276 A1* | 2/2017 | Chen | H01L 23/49838 |

\* cited by examiner

FINGERPRINT SENSING DEVICE AND METHOD FOR MANUFACTURING A FINGERPRINT SENSING DEVICE

CROSS-REFERENCE TO RELATED APPLICATION

The present application is based on and claims the benefit of Swedish patent application Serial No. 1650769-1, filed Jun. 1, 2016, the content of which is hereby incorporated by reference in its entirety.

FIELD OF THE INVENTION

The present invention relates to a fingerprint sensing device. In particular, the present invention relates to a fingerprint sensing device suitable for use under thick cover layers.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance, and user acceptance.

Among the various available fingerprint sensing principles (such as capacitive, optical, thermal etc.), capacitive sensing is most commonly used, in particular in applications where size and power consumption are important issues. All capacitive fingerprint sensors provide a measure indicative of the capacitance between each of several sensing structures and a finger placed on or moved across the surface of the fingerprint sensor.

Due to the geometries involved in a typical fingerprint pattern, the difference in capacitance between a ridge and a valley can be considered to be small. Further, different materials are typically needed between the capacitive sensing elements and the finger. Such materials increases the distance between the finger and the sensing elements and will therefore inevitably further decrease the sensed difference in capacitance between a ridge and a valley. For example, some implementations of capacitive fingerprint sensors in mobile devices demand that the fingerprint sensor is covered by what can be considered very thick materials, such as e.g. a cover glass in a mobile phone. Such implementations will drastically reduce the dynamic range of the sensor.

When further increasing the distance between the sensing elements and the finger, the difference in the capacitive coupling between a ridge and valley quickly reaches a magnitude that is similar or even smaller than the system noise floor of the sensing device. In order to increase sensing performance it is therefore desirable to lower the noise floor.

Accordingly, when the signal-to-noise ratio cannot be improved further by changing the structure or sizing of the signal amplification and readout without significant cost, it's desirable to improve the conditions at the sensing element.

SUMMARY

In view of above-mentioned and other drawbacks of the prior art, it is an object of the present invention to provide an improved fingerprint sensing device exhibiting an increase in signal-to-noise ratio.

According to a first aspect of the invention, there is provided a capacitive fingerprint sensing device for sensing a fingerprint pattern of a finger, said capacitive fingerprint sensing device comprising: a protective top layer to be touched by said finger; a first metal layer comprising a two-dimensional array of sensing structures arranged underneath said top layer; a second metal layer, arranged underneath said first metal layer, comprising a plurality of conductive structures a dielectric layer arranged between the first and second metal layers to electrically insulate the first metal layer from the second metal layer, the dielectric layer comprising a low-k material; and readout circuitry arranged underneath said second metal layer and coupled to each of the electrically conductive sensing structures by means of via connections to receive a sensing signal indicative of a distance between said finger and said sensing structure.

In the present context, the protective top layer is typically a dielectric layer which may be a single layer or it may comprise a plurality of stacked layers. Moreover, that the layer is dielectric means that it is non-conductive, and that it can be representative of a dielectric in a parallel plate capacitor where the two capacitor plates are represented by a finger placed on the outer surface of the sensing device and each of the electrically conductive sensing structures. Accordingly, that the electrically conductive sensing structure is arranged underneath the top layer does not exclude the possibility that there may be additional layers arranged between the sensing structure and the outer surface of the sensing device. The protective dielectric top layer may for example comprise a cover glass, display glass, and overmold layer, other coating layers etc.

In the field of semiconductor manufacturing, the term "low-k" is used to describe a dielectric material having a relative dielectric constant, i.e. a k-value, which is lower than that of silicon dioxide.

Moreover, that the electrically conductive sensing structures are arranged in a two dimensional array should be interpreted to mean that the array extends in two directions, i.e. that it extends in an xy-plane with a plurality of sensing elements in both the x- and y-direction. The fingerprint sensing device is thus to be seen as an area sensor, as opposed to a line sensor. Furthermore, an array should be interpreted as a systematic arrangement of similar objects, here the sensing structures. The sensing structures are thus arranged in a regular pattern. As a whole, the array may have an outline which is regular, such as square or rectangular outline. However, the array may equally well have a circular, freeform or irregular outline.

The readout circuitry is arranged to receive the sensing signal from each active sensing structure and to combine the plurality of sensing signals to form a fingerprint image.

Accordingly, the present invention is based on the realization that the signal-to-noise ratio (SNR) of fingerprint sensing device can be improved by reducing the capacitance between an electrically conductive sensing structure and a conductive structure located underneath the sensing structure and comprised in a pixel in the sensing device, thereby reducing capacitive crosstalk. In particular, the present invention improves the SNR by decreasing one of the main contributions to a parasitic capacitance in the fingerprint sensing ASIC.

A parasitic capacitance, $C_{par}$, between the sensing structure and the underlying conductive structure increases the amplification of the inherent noise of the pixel amplifier, i.e. of the readout circuitry amplifying the sensing signal received from the sensing structure, typically comprising an operational amplifier (op-amp). The increase in noise, noise- Gain can be estimated as noiseGain=$(C_{par}+C_{gain}+C_{use})/C_{Gain}$, where $C_{Gain}$ is a feedback capacitance determining a pixel amplification and $C_{use}$ is the useful capacitance, i.e. the useful capacitance for forming a sensing signal.

The total pixel noise sets a fundamental limit for the size of the signal which can be detected, where the total pixel noise is the inherent noise of the amplifier times the noise gain (noiseGain). Accordingly, the pixel performance can be improved by reducing the parasitic capacitance, which is achieved herein by arranging a low-k material between the sensing structure and the conductive structure.

The fingerprint sensing device comprises a number of metal layers to provide various device functionalities, where the top metal layer, i.e. the first metal layer is used to form the capacitive sensing structures. As discussed above, undesirable parasitic capacitances occur between the capacitive sensing structures and the electrically floating metal structures in the underlying metal layer, i.e. the second metal layer. It can be assumed that there is only a capacitive coupling between the sensing structures in the first layer and the metal structures of the second layer.

In principle the parasitic capacitance can be reduced by increasing the thickness of the dielectric layer between the first and second metal layers. However, the dielectric layer cannot be made too thick since the dimensions of the via connection are proportional to the thickness of the dielectric layer in order to fulfill aspect ratio requirements of the via connection. In other words, a thick dielectric layer may make the via connections too large such that they occupy space required for other components.

Accordingly, a suitable tradeoff between the thickness of the dielectric layer and the via connection dimensions can be found by utilizing low-k dielectric, in which case the capacitive coupling can be reduced without excessively increasing the thickness of the dielectric layer.

Moreover, in some cases, a capacitance between the structures of the first and second metal layer may be desirable since the second metal layer is connected to features and components in underlying metal layers which requiring a capacitor to function. Thereby, the capacitance between the structures of the first and second metal layers cannot be removed entirely.

According to one embodiment of the invention, the dielectric layer may advantageously comprise an organic polymer, which can be configured to have a low-k and which can be deposited in sufficiently thick layers with little stress in the material, thereby facilitating process integration.

In one embodiment of the invention, the dielectric layer may have a thickness of at least 3 μm, and preferably of at least 10 μm. Since the capacitance between two conductive plates is inversely proportional to the distance between the plates, it is desirable to increase the distance between the sensing structure and the underlying conductive plate, i.e. the thickness of the dielectric layer, without increasing the thickness so much that the dimensions of the via connections become problematic.

According to one embodiment of the invention, the dielectric constant k of the low-k material dielectric layer is preferably in the range of $1<k<3.9$. An insulating material is typically referred to as a low-k material if it has a dielectric constant lower than 3.9, which is the dielectric constant of $SiO_2$. The capacitance is inversely proportional to the dielectric constant, making it desirable to select a dielectric material having the lowest possible dielectric constant.

In one embodiment of the invention, the, wherein the dielectric layer may be Polybenzobisoxazole (PBO), Polyimide or Benzocyclobutene (BCB) which all have a dielectric constant in the range of approximately 2.5-3.3. Accordingly, both materials can be considered to be so called low-k materials and they also have material properties making them suitable for integration in a manufacturing process for manufacturing a fingerprint sensing device.

According to one embodiment of the invention the dielectric layer is provided in the form of a dry film. A dry film can be applied to the device by means of lamination, i.e. by using dry film lamination techniques such as e.g. thermocompression bonding, which provides an alternative manufacturing process utilizing standard back-end processing techniques in cases where deposition methods such as spin coating and spray coating cannot be used. A further advantage related to the use of dry films is the well defined material properties of the dry film, such as high thickness uniformity and low defect concentration as a result of the pre-fabricated films.

According to one embodiment of the invention, the sensing device may comprise a metal structure of the second metal layer arranged directly below a sensing structure of the first metal layer having an area smaller than the area of the sensing structure. It can be assumed that the metal structure of the second layer is a part of an overall pixel structure comprising parts in several different metal layers, with the sensing structure in the top metal layer defining the sensing area of the pixel.

According to one embodiment of the invention a thickness and dielectric constant of the dielectric layer may be selected based on a desired capacitance between a sensing structure of the first layer and an underlying metal structure of the second metal layer. The desired capacitance may be a capacitance required for the functionality of the pixel, where the metal structure is electrically connected to other components by means of one or more via connections to provide the desired capacitance.

According to a second aspect of the invention, there is provided a method for manufacturing a fingerprint sensing device, the method comprising; providing a substrate comprising a plurality of metal structures arranged in a metal layer on the surface of the substrate and fingerprint readout circuitry located within the substrate; providing a low-k dielectric layer covering the substrate; forming via connection openings in the dielectric layer; depositing a top metal layer on the dielectric layer forming via connections such that each sensing structure is connected to corresponding readout circuitry by means of the via connections; and patterning the top metal layer to form a two dimensional array of sensing structures.

The substrate comprising metal structures and associated fingerprint readout circuitry can be manufactured according to conventional CMOS processing techniques. The substrate may for example be a silicon wafer comprising a plurality of fingerprint sensor chips.

Moreover, according to the above described manufacturing method, via connection metallization can be performed in the same process step as the formation of the metal layer for the sensing structures. Thereby, the via interconnect formation does not require a separate process step.

The above described manufacturing method also allows a separation of process steps, where the substrate comprising the readout circuitry can be manufactured separately, after which the via connections and sensing structures are formed.

According to one embodiment of the invention, the dielectric layer may deposited using spin coating or spray coating, or the dielectric layer may be deposited using dry film lamination.

According to one embodiment of the invention, the openings in the dielectric layer may be formed using photolithography and etching or direct laser structuring.

According to one embodiment of the invention the metal layer may be deposited using sputtering. Thus, sputtering may be used to form both the via connections and the sensing structures. It is also possible to form the top metal layer using electrodeposition, in which case a metal seed layer may be deposited e.g. by sputtering.

Furthermore, the top metal layer may be patterned using photolithography to form the sensing structures.

Additional effects and features of the second aspect of the invention are largely analogous to those described above in connection with the first aspect of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the device and method according to the present invention are mainly described with reference to a capacitive fingerprint sensing device and to a method for manufacturing such a device.

Figure 1:
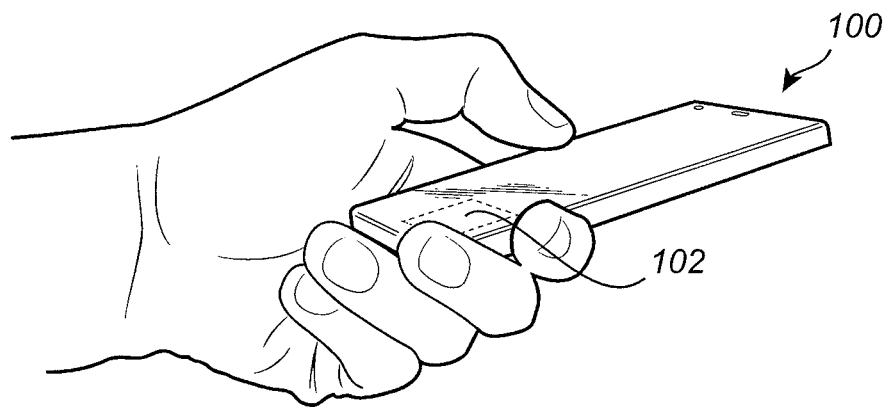
FIG. 1 schematically illustrates a mobile phone comprising a fingerprint sensing device.

FIG. 1 schematically illustrates an application for a fingerprint sensing device 102 according to an example embodiment of the present invention, in the form of a mobile phone 100 with an integrated fingerprint sensing device 102. The fingerprint sensing device is illustrated here as being arranged underneath a cover glass of the mobile phone 100. The fingerprint sensing device 102 may also be arranged in a button, on the side or on a backside of a phone.

The fingerprint sensing device 102 may, for example, be used for unlocking the mobile phone 100 and/or for authorizing transactions carried out using the mobile phone, etc. A fingerprint sensing device 102 according to various embodiments of the invention may also be used in other devices, such as tablet computers, laptops, smart cards or other types of consumer electronics.

Figure 2:
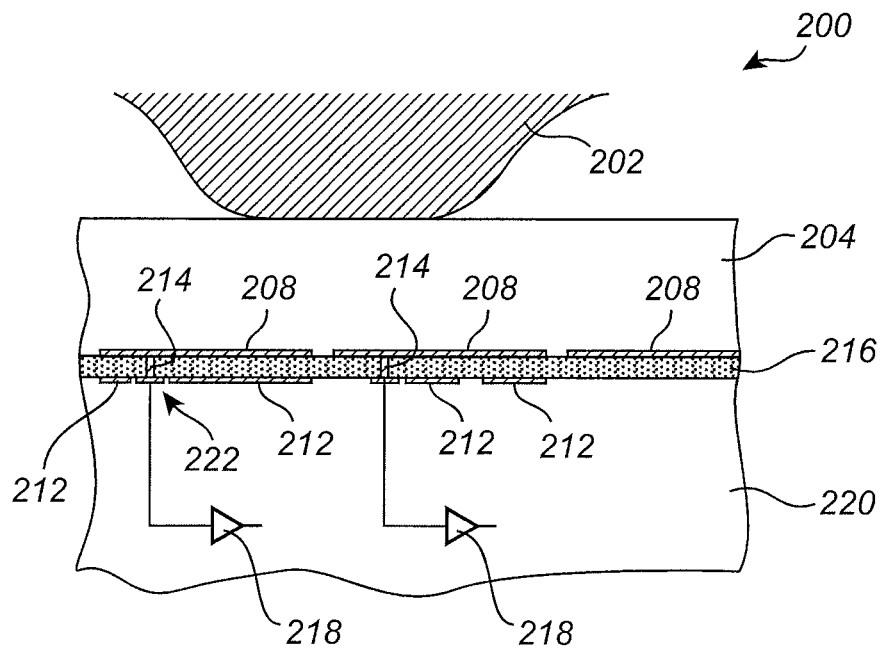
FIG. 2 schematically illustrates a fingerprint sensing device according to an embodiment of the invention.

FIG. 2 is schematic illustration of a part of a capacitive fingerprint sensing device 200 for sensing a fingerprint pattern of a finger 202. The fingerprint sensing device comprises a protective top layer 204 to be touched by the finger, a first metal layer comprising a two-dimensional array of sensing structures 208 arranged underneath the top layer 204, a second metal layer, arranged underneath the first metal layer, comprising a plurality of conductive structures 212, a dielectric layer 216 arranged between the first and second metal layers to electrically insulate the first metal layer from the second metal layer, the dielectric layer 216 comprising a low-k material. The second metal layer also comprises small metal structures 222, sometimes referred to as "landing pads", for the via connections to contact. The sensing device 200 further comprises readout circuitry 218 arranged underneath the second metal layer and coupled to each of the electrically conductive sensing structures 208 by means of via connections 214 to receive a sensing signal indicative of a distance between the finger 202 and the sensing structure 208. The via connections reach through the dielectric layer 216 between the sensing structure 208 and the landing pad 222.

The readout circuitry 218 can be considered to be comprised in a substrate 220. The substrate 220 may for example be a silicon substrate and the fingerprint sensing device 200 may be manufactured using conventional silicon-compatible manufacturing techniques. The finger 202 is here illustrated as a fingerprint ridge in contact with the sensing surface of the sensing device 200.

It should be noted that even though the substrate 220 and the top layer 204 are here illustrated as single layers, both may comprise a plurality of layers, i.e. consist of a stack of layers.

Figure 3:
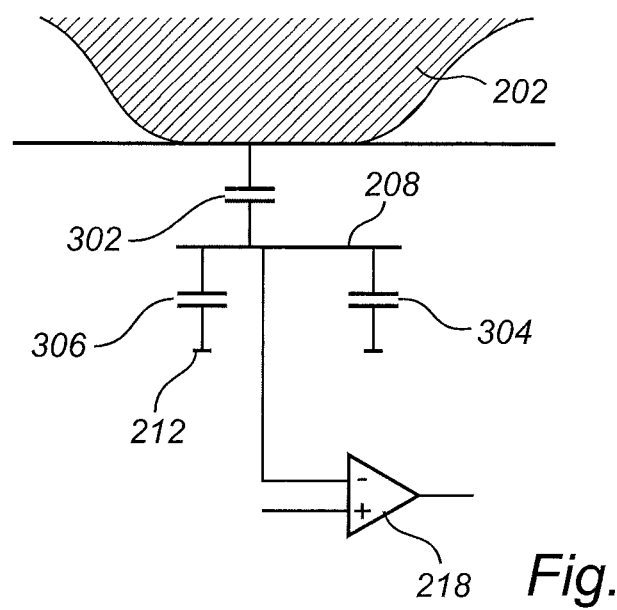
FIG. 3 schematically illustrates part of a fingerprint sensing device according to embodiments of the invention.

FIG. 3 schematically illustrates the capacitance 302 between a finger 202 placed on the sensor and the sensing structure 208. There is also a parasitic capacitance 304 between the sensing structure 208 and underlying metal structures in the second metal layer. One reason for the presence of conductive metal structures in the second layer may in part be related to the minimum allowable amount of metal in the underlying metal layer dictated by manufacturing restrictions, where a metal layer comprising too little metal may not be reliably manufactured. There may also be structures in the second metal layer related to other functionality of the fingerprint sensing device. This is illustrated by the capacitance 306 between the sensing structure 208 and the underlying metal structure 208.

To reduce the parasitic capacitance 304, a low-k dielectric layer 216 is arranged between the first 206 and second metal layer 210. Since the parasitic capacitance is proportional to the dielectric constant, i.e. k-value, of the dielectric layer 216 and inversely proportional to the thickness of the dielectric layer 216, it is desirable to minimize the dielectric constant and maximize the thickness of the dielectric layer 216.

A commonly used dielectric material in semiconductor processing is $SiO_2$ having a dielectric constant of 3.9, and the lowest possible dielectric constant is 1 which is the dielectric constant of air. The low-k material will thus have a k-value between 1 and 3.9. It has been found that organic polymers, and in particular Polybenzobisoxazole (PBO), or Polyimide are advantageous to use to form the dielectric layer, where PBO has a k-value in the range of 2.9 to 3.2 and Polyimide has a k-value in the range of 2.8 to 3.3. Further organic dielectric materials to be used may include Benzocyclobutene (BCB) having a k-value of 2.65 and Polytetrafluoroethylene (PTFE) having a k-value of 2.1.

The thickness of the dielectric layer is at least 3 μm, and preferably at least 10 μm. This should be seen in relation to the distance between the sensing structure 208 and the finger 202 which may be several hundreds of micrometers, such as at least 500 μm if the sensing device is arranged under a cover glass or display glass of an electronic device. Moreover, the size of the sensing structure is typically about 50 µm and the diameter of the via connection is about 5 µm.

Figure 4:
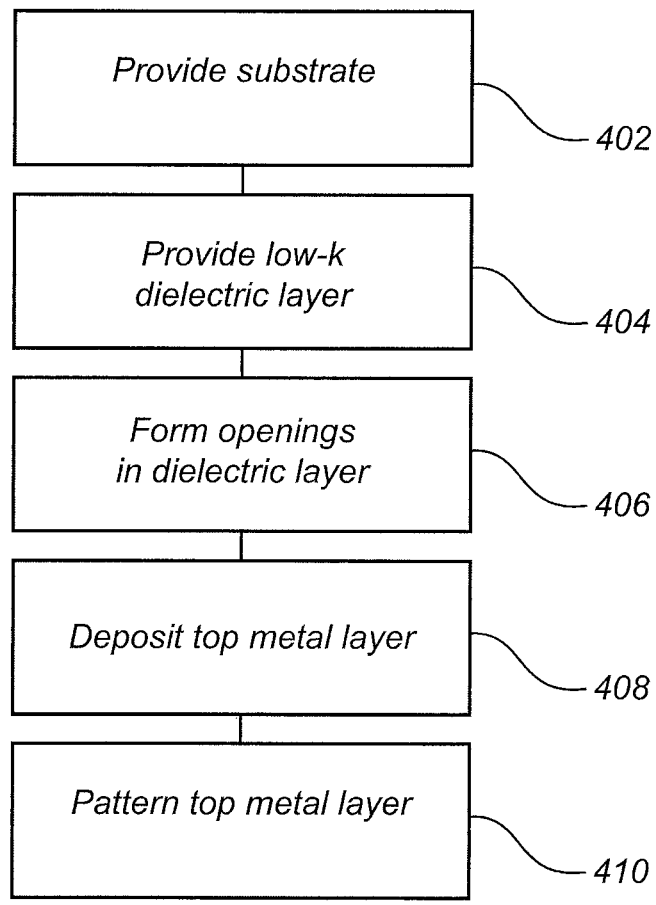
FIG. 4 is a flow chart outlining the general steps of a method according to an embodiment of the invention.

The flow chart of FIG. 4 describes the method according to an embodiment of the invention which will be discussed with reference to FIGS. 5A-E schematically illustrating the steps of the manufacturing method.

Figure 5A:
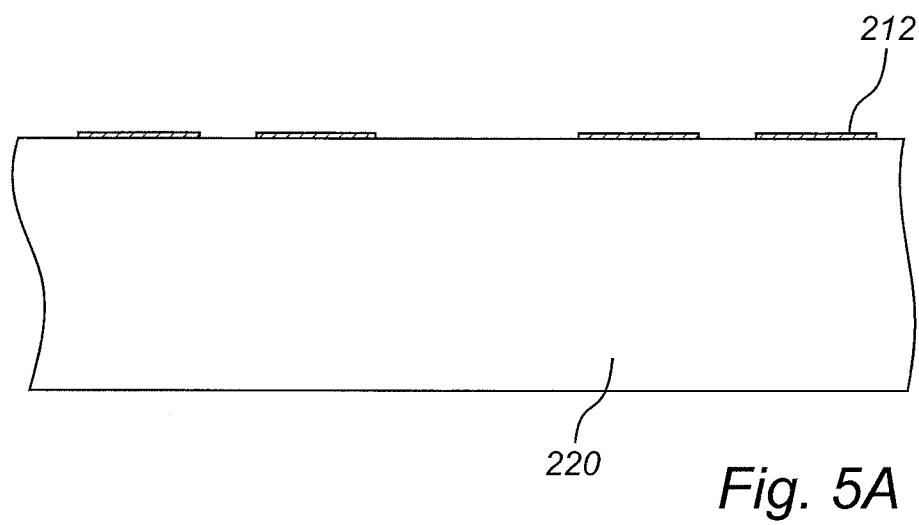
FIGS. 5A-D schematically illustrate a manufacturing method according to embodiments of the invention.

First, a substrate 220 is provided 402 comprising a plurality of metal structures 212 and landing pads 222 as illustrated in FIG. 5A. The metal structures 212 are arranged in the second metal layer, as seen from the top of the device, i.e. from the sensing surface of the sensing device 200. The substrate 220 is further assumed to comprise the associated readout circuitry required for forming a fingerprint image.

Figure 5B:
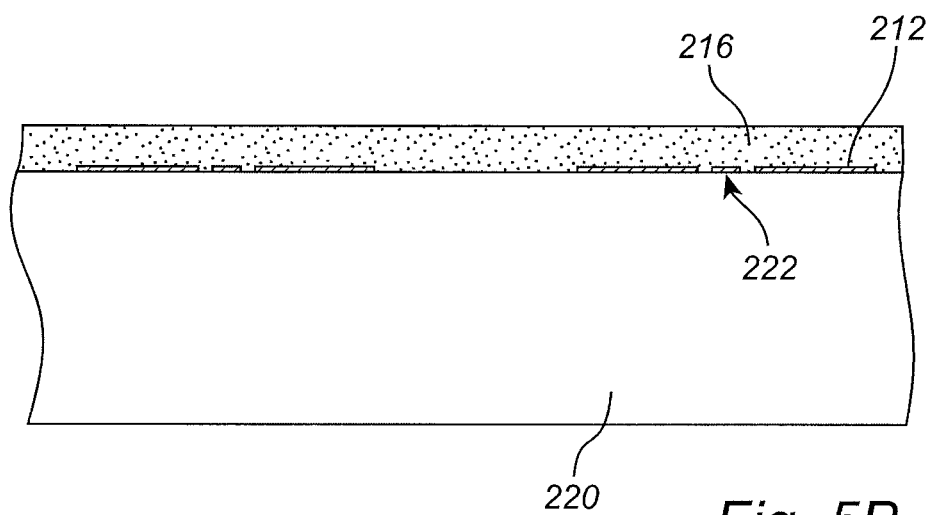

Next, a low-k dielectric layer 216 is provided 404 to cover the substrate 220, including the metal structures 212 as illustrated in FIG. 5B. The low-k dielectric layer 216 may for example be deposited by spin coating, spray coating or by dry film lamination. Here, it is important to achieve a good thickness uniformity of the dielectric layer 216 in order to conform to other process tolerances.

Figure 5C:
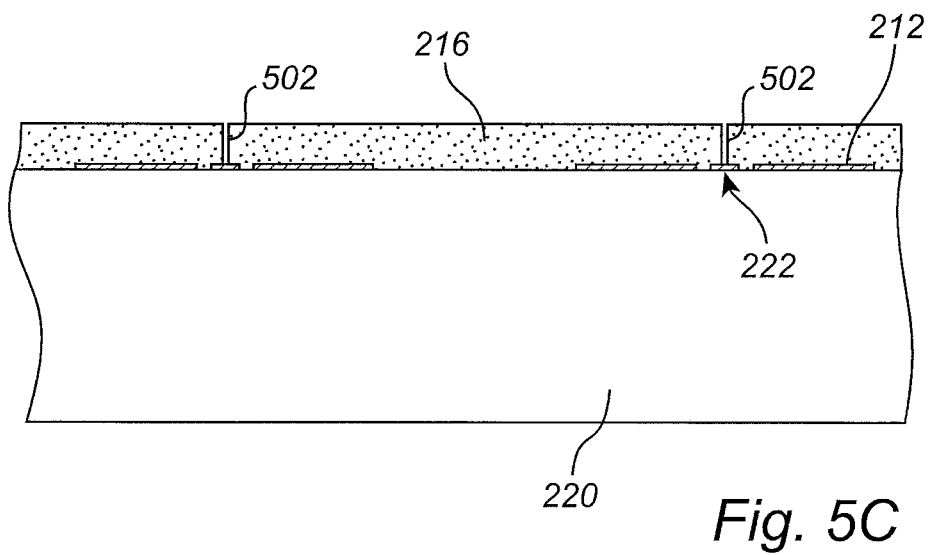

After the dielectric layer 216 has been deposited, FIG. 5C illustrates that openings 502 are formed 406 in the dielectric layer 216 to prepare for via connections to the underlying readout circuitry. The openings are formed at the locations corresponding to the landing pads 222, reaching through the dielectric layer 216 to the landing pads. Next, the top metal layer, i.e. the first metal layer, is deposited 408 such that the openings 502 are filled to form via connections 214 between the first metal layer and the readout circuitry. The top metal layer may for example be deposited using sputtering and/or electrodeposition. Accordingly, the metal for forming the via connections 214 and the sensing structures 208 is deposited in the same process step.

Figure 5D:
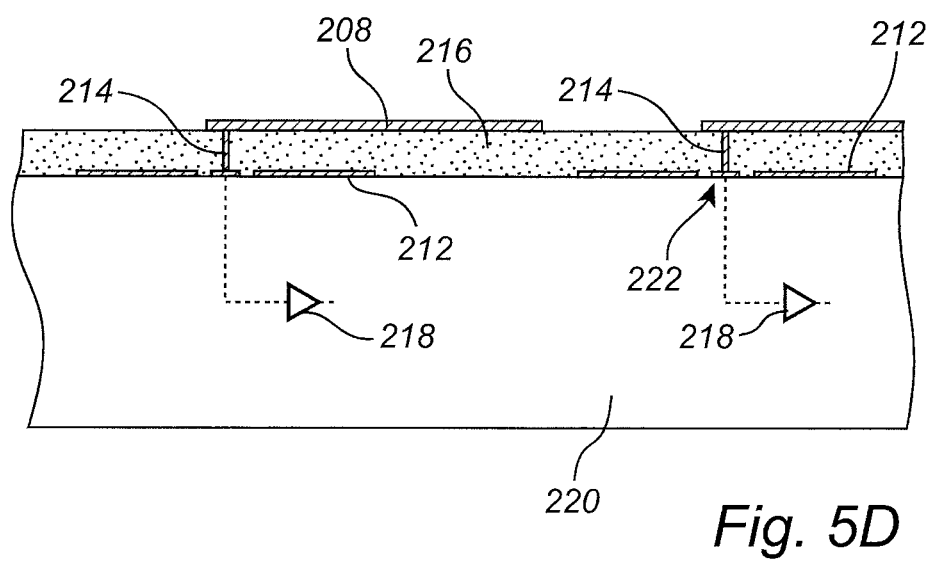

Finally the top metal layer is patterned 410 using photolithography or laser etching to form a two dimensional array of sensing structures 208, which may also be referred to as a pixel array. Each sensing structure is connected to corresponding readout circuitry 218 as illustrated in FIG. 5D.

Furthermore, the pixel array may be covered by additional layers, such as a mold layer for protecting the sensing structures 208. The sensing device may also comprise a protective plate or cover glass attached by means of an adhesive, such that the protective plate forms the outer surface of the sensing device.

Even though the invention has been described with reference to specific exemplifying embodiments thereof, many different alterations, modifications and the like will become apparent for those skilled in the art. Also, it should be noted that parts of the device and method may be omitted, interchanged or arranged in various ways, the device and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A capacitive fingerprint sensing device for sensing a fingerprint pattern of a finger, said capacitive fingerprint sensing device comprising:
   a protective top layer to be touched by said finger;
   a first metal layer comprising a two-dimensional array of sensing structures arranged underneath said protective top layer;
   a second metal layer, arranged underneath said first metal layer, comprising a plurality of conductive structures;
   a dielectric layer arranged between the first and second metal layers to electrically insulate the first metal layer from the second metal layer, the dielectric layer comprising a low-k material configured to reduce a capacitive coupling between the first and second metal layer, thereby reducing capacitive crosstalk between the sensing structures and the conductive structures, wherein the dielectric constant k of the low-k material dielectric layer is in the range of 1<k<3.3; and
   readout circuitry arranged underneath said second metal layer and coupled to each of the electrically conductive sensing structures by means of via connections to receive a sensing signal indicative of a distance between said finger and said sensing structure.

2. The sensing device according to claim 1, wherein the dielectric layer comprises an organic polymer.

3. The sensing device according to claim 1, wherein the dielectric layer has thickness of at least 3 µm.

4. The sensing device according to claim 1, wherein the dielectric layer is Polybenzobisoxazole (PBO), Polyimide or Benzocyclobutene (BCB).

5. The sensing device according to claim 1, wherein the dielectric layer is provided in the form of a dry film.

6. The sensing device according to claim 1, comprising a metal structure of said second metal layer arranged directly below a sensing structure of the first metal layer and having an area smaller than the area of the sensing structure.

7. The sensing device according to claim 6, wherein a thickness and a dielectric constant of the dielectric layer is selected based on a desired capacitance between a sensing structure of the first layer and the underlying metal structure of the second metal layer.

8. A method for manufacturing a fingerprint sensing device, the method comprising;
   providing a substrate comprising a plurality of metal structures arranged in a metal layer on the surface of the substrate and fingerprint readout circuitry located within the substrate;
   providing a low-k dielectric layer covering the substrate, wherein the dielectric constant k of the low-k material dielectric layer is in the range of 1<k<3.3;
   forming via connection openings in the dielectric layer;
   depositing a top metal layer on the dielectric layer forming via connections such that each sensing structure is connected to corresponding readout circuitry by means of said via connections; and
   patterning the top metal layer to form a two dimensional array of sensing structures, wherein the low-k layer is configured to reduce a capacitive coupling between the first and second metal layer, thereby reducing capacitive crosstalk between the sensing structures and the conductive structures.

9. The method according to claim 8, wherein the dielectric layer is deposited using spin coating or spray coating.

10. The method according to claim 8, wherein the dielectric layer is deposited using dry film lamination.

11. The method according to claim 8, wherein the dielectric layer comprises an organic polymer.

12. The method according to claim 8, wherein the metal layer is deposited using sputtering.

13. The method according to claim 8, further comprising electrodeposition of metal to form the top metal layer.

14. The method according to claim 8, wherein the openings in the dielectric layer are formed using photolithography or direct laser structuring.

\* \* \* \* \*